Figure 1:
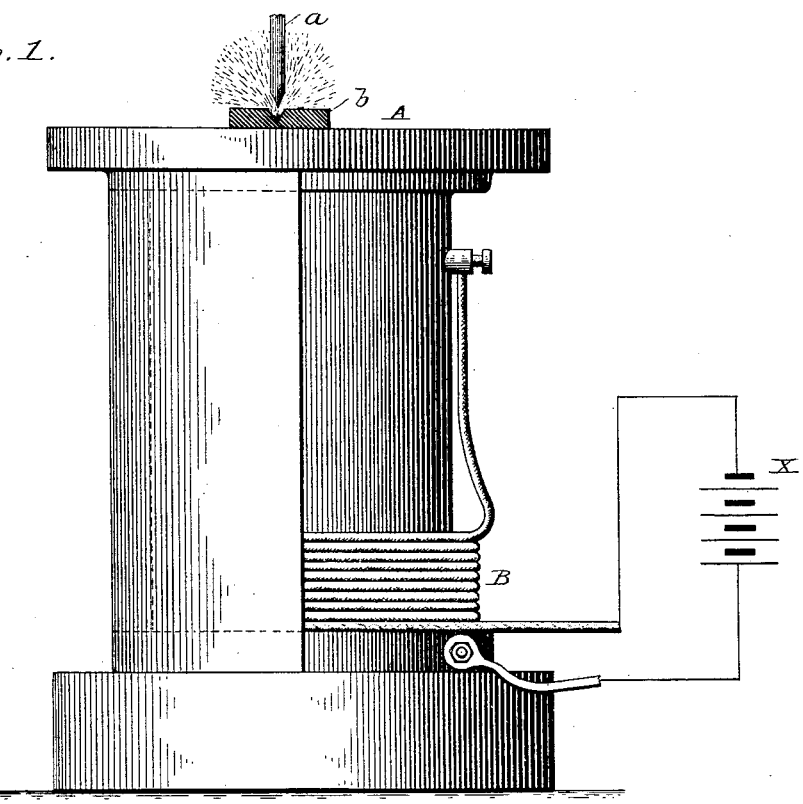

(No Model.) 3 Sheets—Sheet 1.

N. BENARDOS.
APPARATUS FOR WORKING METALS BY ELECTRICITY.

No. 388,246. Patented Aug. 21, 1888.

WITNESSES.
Edwin L. Yewell.
Ewell A. Dick.

INVENTOR.
Nicholas de Benardos,
by Marcellus Bailey,
Attorney.

N. PETERS, Photo-Lithographer, Washington, D. C.

(No Model.) 3 Sheets—Sheet 2.
N. BENARDOS.
APPARATUS FOR WORKING METALS BY ELECTRICITY.
No. 388,246. Patented Aug. 21, 1888.
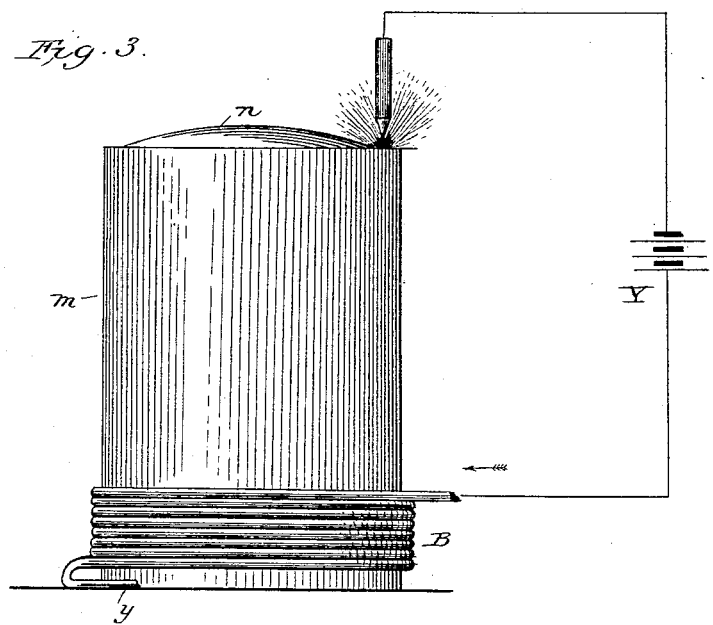

(No Model.) 3 Sheets—Sheet 3.

N. BENARDOS.
APPARATUS FOR WORKING METALS BY ELECTRICITY.

No. 388,246. Patented Aug. 21, 1888.

WITNESSES,
Edwin L. Yewell.

INVENTOR,
Nicholas de Benardos.
G. Marcellus Bailey,
his Attorney,

N. PETERS, Photo-Lithographer, Washington, D. C.

UNITED STATES PATENT OFFICE.

NICHLAS BENARDOS, OF ST. PETERSBURG, RUSSIA.

APPARATUS FOR WORKING METALS BY ELECTRICITY.

SPECIFICATION forming part of Letters Patent No. 388,246, dated August 21, 1888.

Application filed June 6, 1888. Serial No. 276,280. (No model.)

*To all whom it may concern:*

Be it known that I, NICHLAS BENARDOS, of St. Petersburg, in the Empire of Russia, have invented a new and useful Improvement in Working Metals by Electricity, of which the following is a specification.

My present invention is an improvement on the process of welding or working metals by means of the electric arc set forth in United States Letters Patent No. 363,320, of May 17, 1887, and its object is to obtain increased efficiency of action of the electric arc on the metal to be worked or melted and to render more perfect the welded joint made in welding metals by said patented process. This result I attain by a method of operation which consists in subjecting the metal to the influence of an electro-magnet, in the field of which the arc is maintained during the welding operation. This method is the subject of a separate application for Letters Patent in my name, of even date herewith, Serial No. 276,279.

The subject of my present application is an improvement in the appliances which are or may be used in effectuating said method, the improvement consisting, essentially, in making an electro-magnet of the anvil on which the work is supported during the welding operation. In some instances the work is separate from the anvil—that is to say, the piece or pieces to be worked or welded together may simply rest upon and be supported by the electro-magnetic anvil. In other instances a portion of the work itself may constitute the electro-magnetic anvil—that is to say, that piece of the work upon which the other piece (which is to be welded thereto) rests during the welding operation may be temporarily made an electro-magnet.

For the purposes of forming the electro-magnetic anvil, the conducting-cable which forms part of the circuit of the arc may be coiled around the anvil, or in some instances—as, for example, when considerable work is to be executed—an independent cable or conducting-wire not in the arc circuit may be thus coiled around the anvil.

The nature of the improvement and the manner in which the same is or may be carried into effect will be readily understood by reference to the accompanying drawings, in which—

Figure 2:
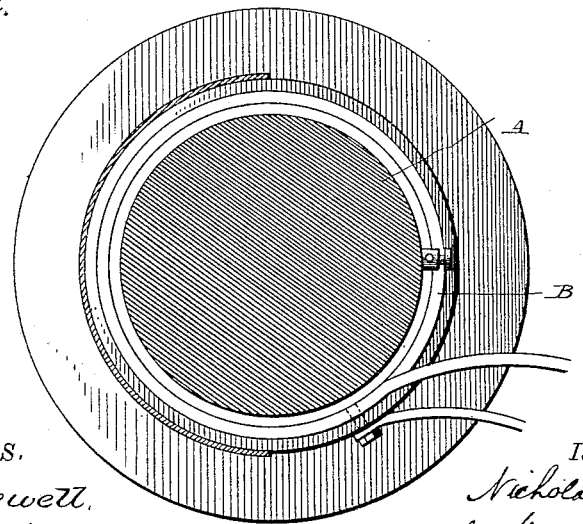
Figure 5:
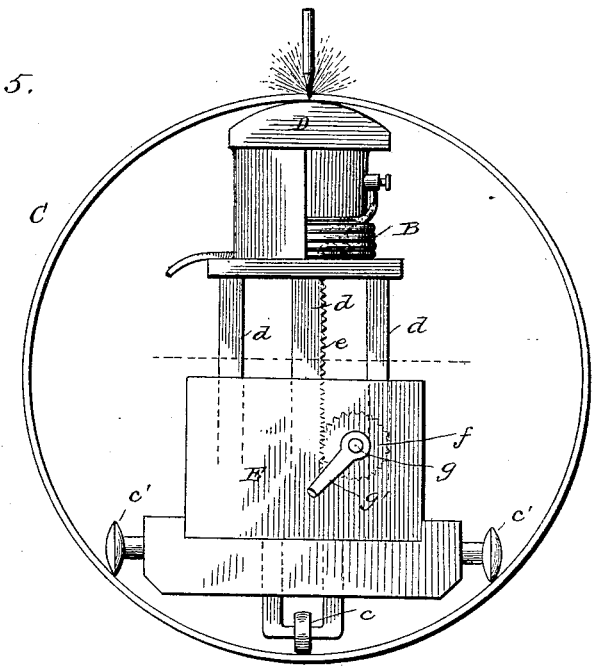
Figure 6:
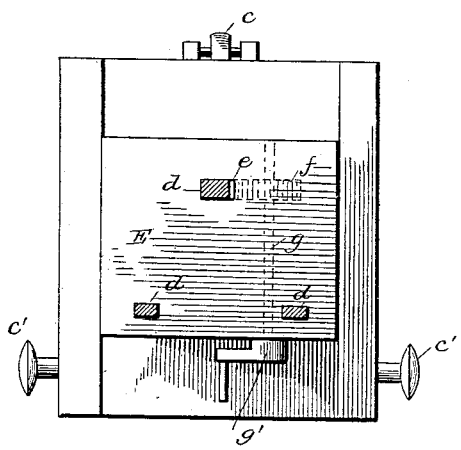

Figure 1 is a side elevation, and Fig. 2 is a section, of an apparatus embodying my invention. Fig. 3 is a side elevation of a modification, and Fig. 4 is a section of the same. Fig. 5 is a side elevation of still another modification, and Fig. 6 is a section of the same.

In Fig. 1, $a$ is the carbon conductor, and $b$ is the work between which and the carbon the electric arc is formed, all as in Letters Patent No. 363,320, hereinbefore named.

A is the anvil on which the work is supported, made of a material suitable to form the core of an electro-magnet. Surrounding this anvil is a coil of insulated wire, B, which is in circuit with any source of electrical supply, typified by a battery, X. The circuit is from one pole of battery through coil B, thence through the anvil-core A, and thence back to battery X. In this instance the anvil, for convenience' sake, is in the circuit of battery X; but manifestly it need not be—that is to say, the insulated wire which leads from one pole of the battery may, after coiling around the core, lead directly back to the other pole of battery. In this way the anvil is made the core of an electro-magnet, in the field of which the electric arc should be maintained during the operation of welding or melting the work. The effect is to influence for good not only the electric arc but the molten metal itself. The arc acts in a steady concentrated manner without disturbance or interruption, and thereby the metal is melted more energetically, rapidly, and evenly, and the workman is enabled to manage the arc and the work more readily and effectively. There are fewer flaws created in the metal, it becomes more fluid, and the surface of the welded part is much smoother than would be the case if the metal were worked upon an ordinary anvil. In fact, the section of a joint welded in this way shows a perfectly uniform joining without any porous portions.

In Figs. 1 and 2 the coil of the electro-magnetic anvil is in a circuit apart from that in which the carbon $a$ and work $b$ are included, and this is sometimes of advantage, especially when considerable work is to be executed; but, if desired, the cable or coil for the anvil may be in the arc circuit, and if the object itself to be operated on cannot be placed on a separate anvil that object itself can sometimes be transformed into the core of an electro-magnet. This variation is illustrated in Figs. 3 and 4, where the invention is applied to the welding together of a cylinder and one of its heads or ends.

The cylinder $m$, to which the head $n$ is to be welded, has coiled around it the conducting-cable B, leading from the accumulator or other source of electrical supply of the electric-arc circuit, typified by the battery Y. The cable, after being coiled the proper number of times around the cylinder $m$, is electrically connected thereto at $y$. The circuit is as shown in Fig. 3. In this instance the cylinder is the electro-magnetic anvil on which the head $n$ is supported during the welding operation.

For the purpose of working very large objects, which may neither be placed upon and moved along over an anvil nor be surrounded by a coil, an apparatus such as shown in Figs. 5 and 6 may be employed. In these figures the apparatus is supposed to be applied to the welding of the longitudinal seam of a boiler, C. Under this seam is placed an anvil, D, which is the core of an electro-magnet whose coil is shown at B. The electrical connections in this case are the same as in Figs. 3 and 4; but the coils (as is true also of that in Figs. 3 and 4) may be in a separate circuit from that which includes the electric arc. The electro-magnetic anvil is placed within the boiler and is mounted on trucks or wheels $c$ $c'$ $c'$, so that it may be moved along as the work progresses, with a view, as before stated, of keeping the arc constantly in the field of the electro-magnet. For the purpose of applying this apparatus to cylinders of various diameters, the electro-magnetic anvil is vertically adjustable in the truck-frame E, for which purpose it has legs $d$ sliding in vertical guides in said frame, one of these legs being provided with a rack, $e$, on one of its faces, which is engaged by a pinion, $f$, on a shaft, $g$, mounted in the truck-frame. By rotating this shaft by its handle $g'$ the anvil can be raised and lowered, as desired, and it can be maintained in adjusted position by the ordinary ratchet-and-pawl detent appliance or by other well-known or suitable instrumentalities used for like purposes in the arts.

The method, in the hereinbefore-referred-to process of welding or working metals by means of the electric arc, of improving the metal and enhancing the efficiency of the arc by subjecting the same to the influence of an electro-magnet in the field of which the arc is maintained during the welding operation, is not here claimed, the same having been made by me the subject of a separate application of even date herewith, Serial No. 276,279.

What I here claim as new and of my own invention is as follows:

1. An electro-magnetic anvil or supporting-table for metals to be worked or welded by the electric arc, in combination with appliances for forming said arc, substantially as hereinbefore set forth.

2. An anvil or supporting-table for metals to be worked or welded by the electric arc, made of material suitable to form the core of an electro-magnet, surrounded by an insulated coil, which is included in the circuit of the said arc, substantially as and for the purposes hereinbefore set forth.

In testimony whereof I have hereunto set my hand this 11th day of April, A. D. 1888.

NICHLAS BENARDOS.

Witnesses:
  N. TSCHEKALOFF,
  EDWARD TRESHVILLE.